US012767158B2

(12) United States Patent
Tsumura et al.

(10) Patent No.: US 12,767,158 B2
(45) Date of Patent: Oct. 20, 2026

(54) CONTROLLER AND CONTROL METHOD

(71) Applicant: Robert Bosch GmbH, Stuttgart (DE)

(72) Inventors: Kaita Tsumura, Kanagawa (JP); Junya Iwatsuki, Kanagawa (JP); Naoyuki Yamamoto, Kanagawa (JP)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 18/993,178

(22) PCT Filed: Jun. 28, 2023

(86) PCT No.: PCT/IB2023/056658
§ 371 (c)(1),
(2) Date: Jan. 10, 2025

(87) PCT Pub. No.: WO2024/013598
PCT Pub. Date: Jan. 18, 2024

(65) Prior Publication Data

US 2025/0360936 A1 Nov. 27, 2025

(30) Foreign Application Priority Data

Jul. 15, 2022 (JP) ................................ 2022-113574

(51) Int. Cl.
*B60W 50/12* (2012.01)
*B60W 30/14* (2006.01)
(Continued)

(52) U.S. Cl.
CPC .......... *B60W 50/12* (2013.01); *B60W 30/143* (2013.01); *B62K 11/14* (2013.01);
(Continued)

(58) Field of Classification Search
CPC ............... B60W 50/12; B60W 30/143; B60W 2300/36; B60W 2520/10; B60W 2540/10;
(Continued)

(56) References Cited

U.S. PATENT DOCUMENTS 8,437,929 B2 * 5/2013 Suzuki .................. B60W 10/11 701/54
2008/0035397 A1 * 2/2008 Tanaka .................. B60L 50/16 903/902
(Continued)

FOREIGN PATENT DOCUMENTS

EP 3708475 A1 9/2020
EP 3974274 A2 3/2022
(Continued)

OTHER PUBLICATIONS

International Search Report and Written Opinion for PCT/IB2023/056658 dated Aug. 31, 2023 (10 pages).

*Primary Examiner* — Russell Frejd
(74) *Attorney, Agent, or Firm* — Michael Best & Friedrich LLP

(57) ABSTRACT

The invention obtains a controller and a control method capable of improving operability of a straddle-type vehicle. In a controller 20 and a control method according to the invention, an execution section of the controller 20 executes a control mode in which vehicle speed control is enabled in response to a first trigger and the vehicle speed control is disabled in response to a second trigger. In the vehicle speed control, a vehicle speed of a straddle-type vehicle 1 is controlled on the basis of a target vehicle speed in the case where it is determined that the straddle-type vehicle 1 travels on a downhill road. The execution section executes the control mode on the basis of rotational operation information as information on a rotational operation to rotate an accelerator grip, which is located at a reference position in an unloaded state by a rider of the straddle-type vehicle 1 and changes drive power generated to the straddle-type vehicle 1 when being rotated within an angle range located in a first direction with the reference position being a reference, within an angle range located in a second direc-
(Continued)

tion as a reverse direction from the first direction with the reference position being the reference.

15 Claims, 5 Drawing Sheets

(51) Int. Cl.
*B62K 11/14* (2006.01)
*B62M 7/02* (2006.01)

(52) U.S. Cl.
CPC ........... *B62M 7/02* (2013.01); *B60W 2300/36* (2013.01); *B60W 2520/10* (2013.01); *B60W 2540/10* (2013.01); *B60W 2552/15* (2020.02); *B60W 2720/10* (2013.01)

(58) Field of Classification Search
CPC .......... B60W 2552/15; B60W 2720/10; B62K 11/14; B62K 23/04; B62M 7/02; B62J 45/20; B60T 2201/04; B62L 3/023; B62L 3/04
See application file for complete search history.

(56) References Cited

U.S. PATENT DOCUMENTS

2010/0268431 A1* 10/2010 Itagaki ................ F02D 41/2464 74/504
2010/0282210 A1* 11/2010 Itagaki ................ F02D 41/2422 123/399
2014/0032077 A1* 1/2014 Sasaki ................... B60W 30/14 701/93
2014/0142808 A1* 5/2014 Hirade ................. H05B 39/047 701/36
2021/0309222 A1 10/2021 Huebner et al.
2023/0107472 A1* 4/2023 Ozeki ................. B60W 30/143 701/94

FOREIGN PATENT DOCUMENTS

JP 2009116882 A1 5/2009
JP 2021066364 A 4/2021

* cited by examiner

[FIG. 1]
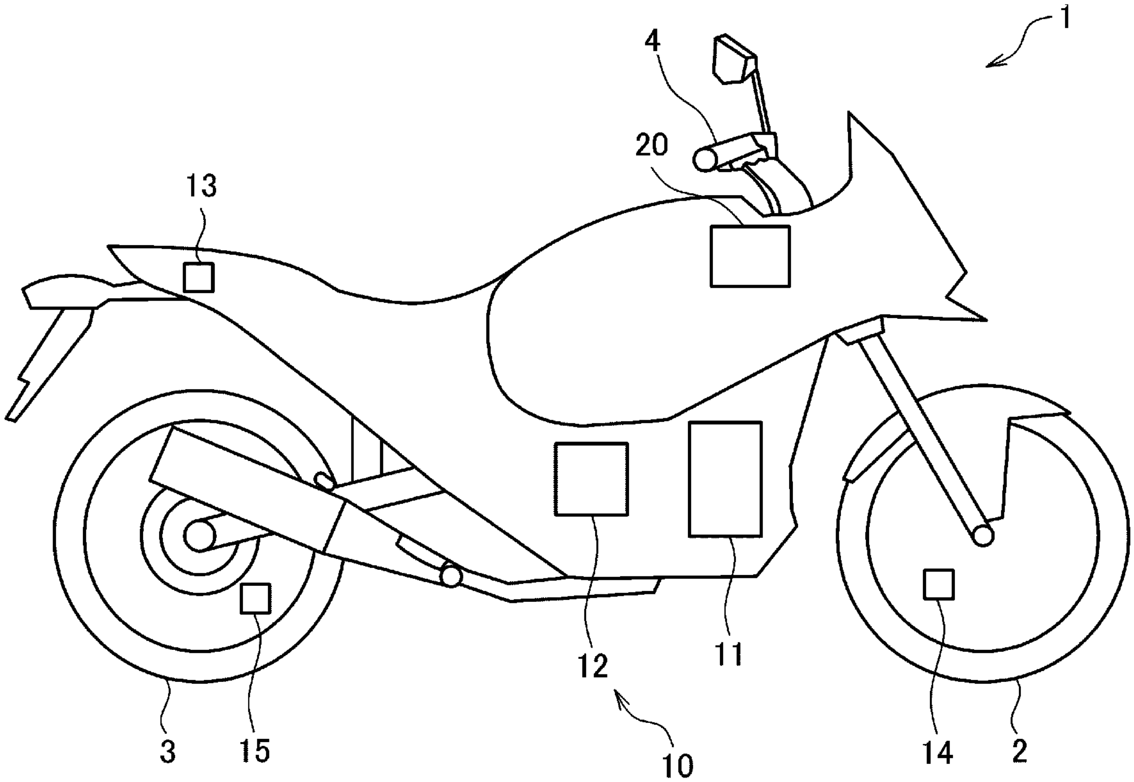
[FIG. 2]
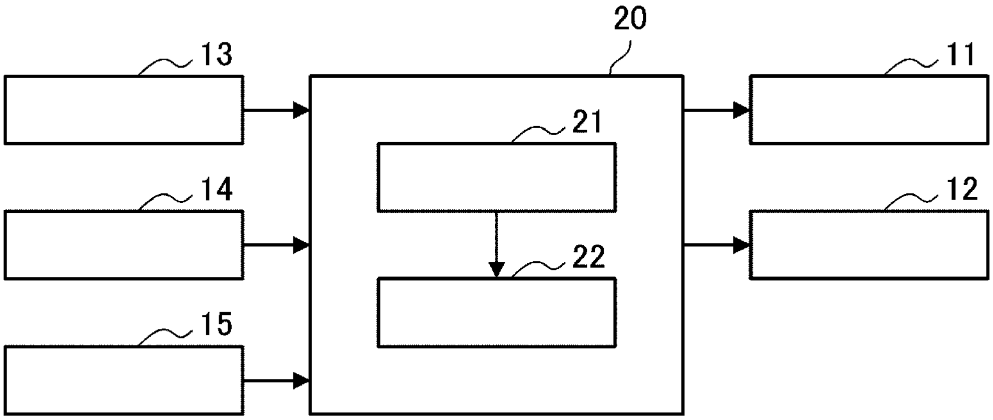

[FIG. 3]
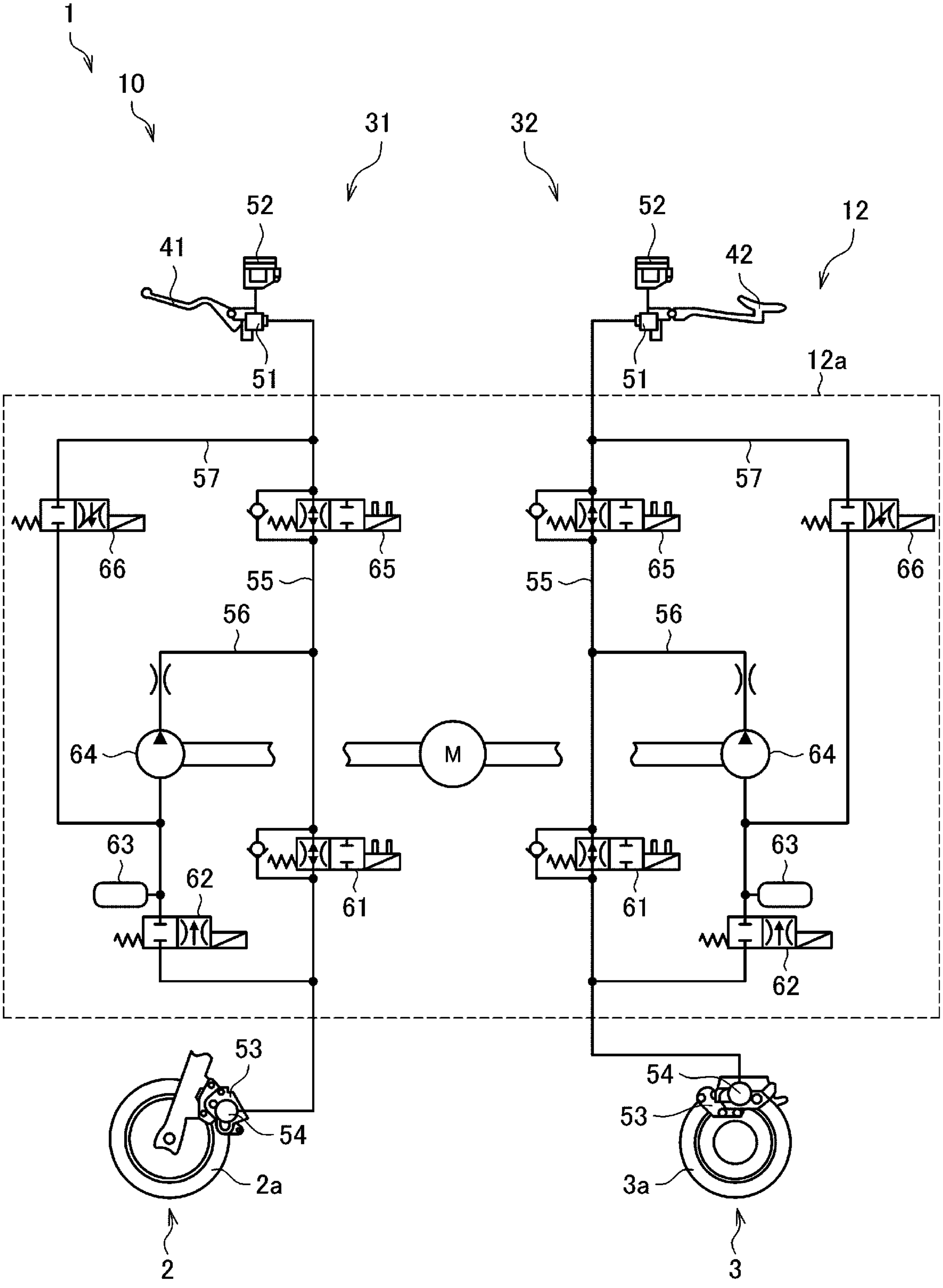

[FIG. 4]
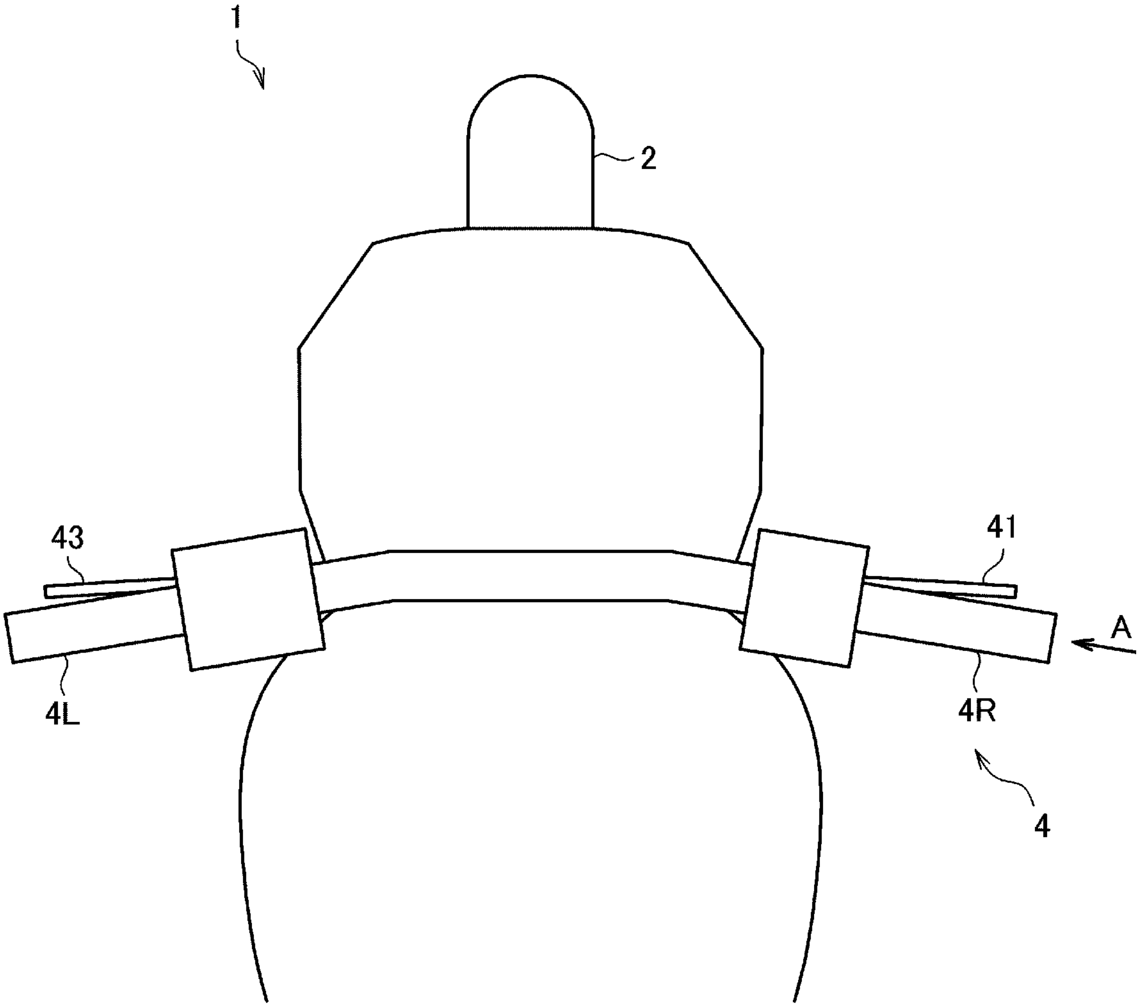
[FIG. 5]
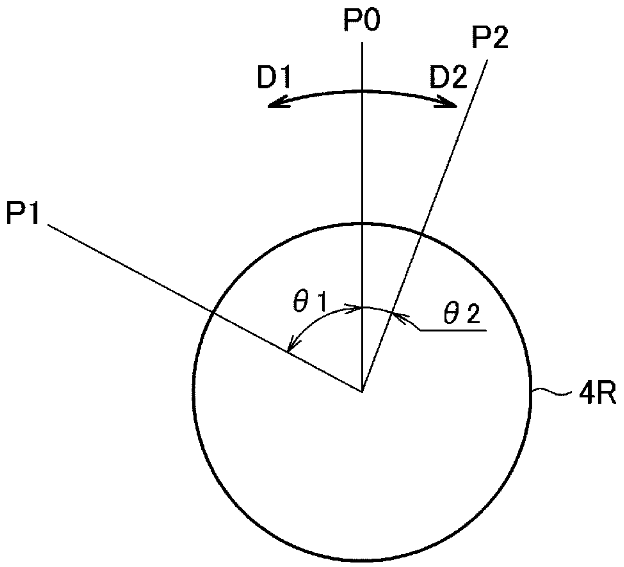

[FIG. 6]
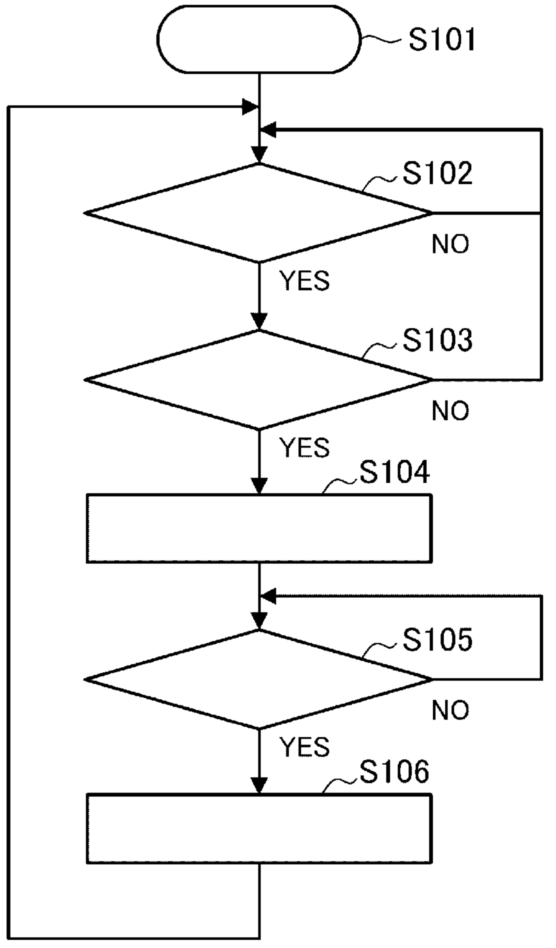

[FIG. 7]
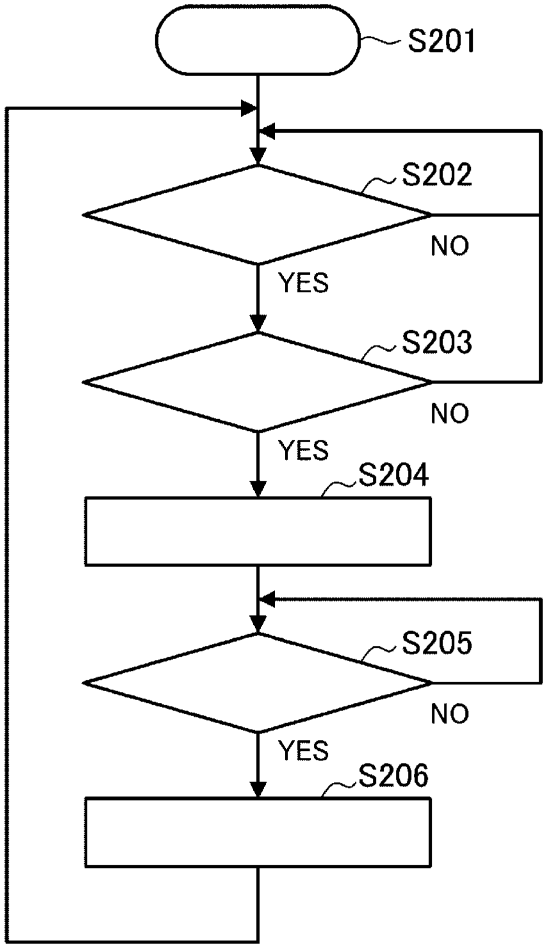
[FIG. 8]
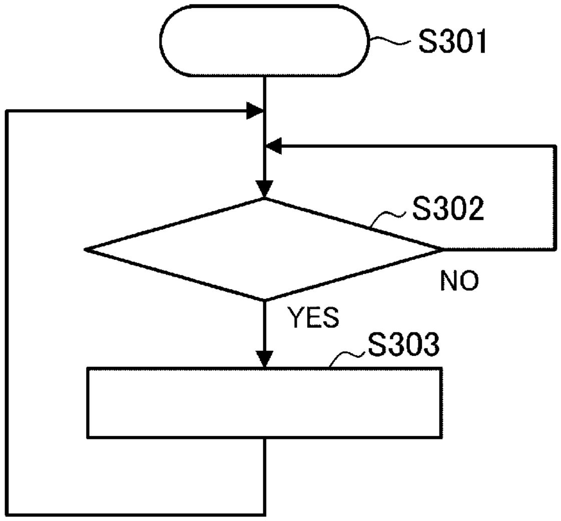

CONTROLLER AND CONTROL METHOD

BACKGROUND

The present invention relates to a controller and a control method capable of improving operability of a straddle-type vehicle.

As a conventional technique related to a straddle-type vehicle such as a motorcycle, a technique of assisting with driving by a rider has been available. For example, a driver-assistance system is disclosed in JP2009-116882A. The driver-assistance system warns the rider of the motorcycle that the motorcycle inappropriately approaches an obstacle on the basis of information detected by a sensor device that detects the obstacle present in a travel direction or substantially in the travel direction.

SUMMARY

By the way, as the technique of assisting with driving by the rider of the straddle-type vehicle, there is a technique of automatically suppressing a vehicle speed of the straddle-type vehicle to be low at the time when the straddle-type vehicle travels on a downhill road. More specifically, such a technique is vehicle speed control for controlling the vehicle speed of the straddle-type vehicle on the basis of a target vehicle speed in the case where it is determined that the straddle-type vehicle travels on the downhill road. Here, it is desired to improve operability of an operation related to the vehicle speed control in order to improve operability of the straddle-type vehicle.

The invention has been made with the above-described problem as the background and therefore obtains a controller and a control method capable of improving operability of a straddle-type vehicle.

A controller according to the invention is a controller that controls behavior of a straddle-type vehicle, and includes an execution section that executes a control mode in which vehicle speed control is enabled in response to a first trigger and the vehicle speed control is disabled in response to a second trigger. In the vehicle speed control, a vehicle speed of the straddle-type vehicle is controlled on the basis of a target vehicle speed in the case where it is determined that the straddle-type vehicle travels on a downhill road. The execution section executes the control mode on the basis of rotational operation information as information on a rotational operation to rotate an accelerator grip, which is located at a reference position in an unloaded state by the rider of the straddle-type vehicle and changes drive power generated to the straddle-type vehicle when being rotated within an angle range located in a first direction with the reference position being a reference, within an angle range located in a second direction as a reverse direction from the first direction with the reference position being the reference.

A control method according to the invention is a control method for controlling behavior of a straddle-type vehicle, and includes: executing a control mode in which vehicle speed control is enabled in response to a first trigger and the vehicle speed control is disabled in response to a second trigger by an execution section of a controller, in the vehicle speed control, a vehicle speed of the straddle-type vehicle being controlled on the basis of a target vehicle speed in the case where it is determined that the straddle-type vehicle travels on a downhill road; and executing the control mode by the execution section on the basis of rotational operation information as information on a rotational operation to rotate an accelerator grip, which is located at a reference position in an unloaded state by a rider of the straddle-type vehicle and changes drive power generated to the straddle-type vehicle when being rotated within an angle range located in a first direction with the reference position being a reference, within an angle range located in a second direction as a reverse direction from the first direction with the reference position being the reference.

In the controller and the control method according to the invention, the execution section of the controller executes the control mode in which the vehicle speed control is enabled in response to the first trigger and the vehicle speed control is disabled in response to the second trigger. In the vehicle speed control, the vehicle speed of the straddle-type vehicle is controlled on the basis of the target vehicle speed in the case where it is determined that the straddle-type vehicle travels on the downhill road. The execution section executes the control mode on the basis of the rotational operation information as the information on the rotational operation to rotate the accelerator grip, which is located at the reference position in the unloaded state by the rider of the straddle-type vehicle and changes the drive power generated to the straddle-type vehicle when being rotated within the angle range located in the first direction with the reference position being the reference, within the angle range located in the second direction as the reverse direction from the first direction with the reference position being the reference. In this way, the rider can use the vehicle speed control with an intuitive or simple operation and thus can improve operability of the operation related to the vehicle speed control. Therefore, it is possible to improve operability of the straddle-type vehicle.

BRIEF DESCRIPTION OF THE DRAWINGS

FIG. 1 is a schematic view illustrating an outline configuration of a straddle-type vehicle according to an embodiment of the invention.

FIG. 2 is a block diagram illustrating an exemplary functional configuration of a controller according to the embodiment of the invention.

FIG. 3 is a schematic view illustrating an outline configuration of a brake system for the straddle-type vehicle according to the embodiment of the invention.

FIG. 4 is a schematic view illustrating an outline configuration of a handlebar and surroundings thereof according to the embodiment of the invention.

FIG. 5 is a schematic view illustrating a rotational direction of an accelerator grip according to the embodiment of the invention.

FIG. 6 is a flowchart illustrating an example of a first processing procedure that is executed by the controller according to the embodiment of the invention.

FIG. 7 is a flowchart illustrating an example of a second processing procedure that is executed by the controller according to the embodiment of the invention.

FIG. 8 is a flowchart illustrating an example of a third processing procedure that is executed by the controller according to the embodiment of the invention.

DETAILED DESCRIPTION

A description will hereinafter be made on a controller and a control method according to the invention with reference to the drawings.

Hereinafter, a description will be made on a controller that is used for a two-wheeled motorcycle (see a straddle-type vehicle 1 in FIG. 1). However, a vehicle as a control target of the controller according to the invention only needs to be a straddle-type vehicle, and may be a straddle-type vehicle other than the two-wheeled motorcycle. The straddle-type vehicle means a vehicle that a rider straddles. Examples of the straddle-type vehicle are motorcycles (a two-wheeled motor vehicle and a three-wheeled motor vehicle) and an all-terrain vehicle. The motorcycles include a vehicle having an engine as a power source, a vehicle having an electric motor as the power source, and the like. Examples of the motorcycles are a motorbike, a scooter, and an electric scooter.

In addition, a description will hereinafter be made on a case where the engine (more specifically, an engine 11 in FIG. 1, which will be described below) is mounted as a drive source that can output power for driving a wheel. However, as the drive source, a drive source other than the engine (for example, an electric motor) may be mounted, or plural drive sources may be mounted.

Furthermore, a description will hereinafter be made on a case where a hydraulic pressure control unit for braking the wheel by using a brake fluid (more specifically, a hydraulic pressure control unit 12 in FIG. 1, which will be described below) is adopted as a mechanism that brakes the straddle-type vehicle. However, the mechanism that brakes the straddle-type vehicle may be a mechanism other than the hydraulic pressure control unit. For example, as the mechanism that brakes the straddle-type vehicle, a mechanism that brakes the wheel by using electric power may be adopted. Alternatively, a mechanism that brakes the wheel by using the electric motor capable of outputting the power for driving the wheel may be adopted.

A configuration, operation, and the like, which will be described below, merely constitute one example. The controller and the control method according to the invention are not limited to a case with such a configuration, such operation, and the like.

The same or similar description will appropriately be simplified or will not be made below. In the drawings, the same or similar members or portions will not be denoted by a reference sign or will be denoted by the same reference sign. A detailed structure will appropriately be illustrated in a simplified manner or will not be illustrated.

<Configuration of Straddle-Type Vehicle>

A description will be made on a configuration of the straddle-type vehicle 1 according to the embodiment of the invention with reference to FIG. 1 to FIG. 5.

FIG. 1 is a schematic view illustrating an outline configuration of the straddle-type vehicle 1. The straddle-type vehicle 1 is a two-wheeled motorcycle that corresponds to an example of the straddle-type vehicle according to the invention. As illustrated in FIG. 1, the straddle-type vehicle 1 includes a front wheel 2, a rear wheel 3, a handlebar 4, the engine 11, the hydraulic pressure control unit 12, an inertial measurement unit (IMU) 13, a front-wheel rotational frequency sensor 14, a rear-wheel rotational frequency sensor 15, and a controller (ECU) 20.

The engine 11 corresponds to an example of the drive source for the straddle-type vehicle 1, and can output power for driving a drive wheel (more specifically, the rear wheel 3). For example, the engine 11 is provided with: one or plural cylinders, each of which is formed with a combustion chamber therein; a fuel injector that injects fuel into the combustion chamber; and an ignition plug. When the fuel is injected from the fuel injector, air-fuel mixture containing air and the fuel is produced in the combustion chamber, and the air-fuel mixture is then ignited by the ignition plug and burned. Consequently, a piston provided in the cylinder reciprocates to cause a crankshaft to rotate. In addition, a throttle valve is provided to an intake pipe of the engine 11, and an intake air amount to the combustion chamber varies according to a throttle opening amount as an opening amount of the throttle valve.

The hydraulic pressure control unit 12 is a unit that has a function of controlling a braking force generated on the wheel. For example, the hydraulic pressure control unit 12 includes components (for example, a control valve and a pump) that are provided on an oil channel connecting a master cylinder and a wheel cylinder and control a brake hydraulic pressure in the wheel cylinder. The braking force generated on the wheel is controlled when operation of the components in the hydraulic pressure control unit 12 is controlled. A detailed description on a brake system 10 that includes the hydraulic pressure control unit 12 will be made below.

The inertial measurement unit 13 includes a three-axis gyroscope sensor and a three-directional acceleration sensor, and detects a posture of the straddle-type vehicle 1. The inertial measurement unit 13 is provided to a trunk of the straddle-type vehicle 1, for example. For example, the inertial measurement unit 13 detects a pitch angle of the straddle-type vehicle 1 and outputs a detection result. The inertial measurement unit 13 may detect another physical quantity that can substantially be converted to the pitch angle of the straddle-type vehicle 1. The pitch angle corresponds to an angle representing a tilt in a vertical direction of a body (more specifically, the trunk) of the straddle-type vehicle 1 with respect to a horizontal direction. In other words, the pitch angle corresponds to an angle that represents how much the body of the straddle-type vehicle 1 rotates from the posture facing the horizontal direction in a pitch direction as a rotational direction with an axis in a vehicle right-left direction being a center. The inertial measurement unit 13 may only include parts of the three-axis gyroscope sensor and the three-directional acceleration sensor.

The front-wheel rotational frequency sensor 14 is a wheel rotational frequency sensor that detects a rotational frequency of the front wheel 2 (for example, a rotational frequency of the front wheel 2 per unit time [rpm], a travel distance of the front wheel 2 per unit time [km/h], or the like), and outputs a detection result. The front-wheel rotational frequency sensor 14 may detect another physical quantity that can substantially be converted to the rotational frequency of the front wheel 2. The front-wheel rotational frequency sensor 14 is provided to the front wheel 2.

The rear-wheel rotational frequency sensor 15 is a wheel rotational frequency sensor that detects a rotational frequency of the rear wheel 3 (for example, the rotational frequency of the rear wheel 3 per unit time [rpm], a travel distance of the rear wheel 3 per unit time [km/h], or the like), and outputs a detection result. The rear-wheel rotational frequency sensor 15 may detect another physical quantity that can substantially be converted to the rotational frequency of the rear wheel 3. The rear-wheel rotational frequency sensor 15 is provided to the rear wheel 3.

The controller 20 controls behavior of the straddle-type vehicle 1. For example, the controller 20 is partially or entirely be constructed of a microcomputer, a microprocessor unit, memory, or the like. Alternatively, the part of the controller 20 or the entire controller 20 may be one whose firmware and the like can be updated, or may be a program module or the like that is executed by a command from a CPU or the like, for example. The controller 20 may be provided as one unit or may be divided into plural units, for example.

FIG. 2 is a block diagram illustrating an exemplary functional configuration of the controller 20. As illustrated in FIG. 2, the controller 20 includes an acquisition section 21 and an execution section 22, for example. In addition, the controller 20 communicates with each of the devices in the straddle-type vehicle 1.

The acquisition section 21 acquires information from each of the devices in the straddle-type vehicle 1, and outputs the acquired information to the execution section 22. For example, the acquisition section 21 acquires information from the inertial measurement unit 13, the front-wheel rotational frequency sensor 14, and the rear-wheel rotational frequency sensor 15. In the present specification, the acquisition of the information can include extraction, generation, and the like of the information.

The execution section 22 executes various types of control by controlling operation of each of the devices in the straddle-type vehicle 1. For example, the execution section 22 controls the operation of the engine 11 and the hydraulic pressure control unit 12.

A description will herein be made on an outline configuration of the brake system 10 for the straddle-type vehicle 1 and control of the braking force generated to the straddle-type vehicle 1 with reference to FIG. 3. FIG. 3 is a schematic view illustrating the outline configuration of the brake system 10 in the straddle-type vehicle 1. As illustrated in FIG. 3, the brake system 10 has a front-wheel brake mechanism 31, a rear-wheel brake mechanism 32, a first brake operation section 41, and a second brake operation section 42. The first brake operation section 41 is a brake lever, for example. The front-wheel brake mechanism 31 brakes the front wheel 2 in an interlocking manner with at least the first brake operation section 41. The second brake operation section 42 is a brake pedal, for example. The rear-wheel brake mechanism 32 brakes the rear wheel 3 in an interlocking manner with at least the second brake operation section 42. The front-wheel brake mechanism 31 and the rear-wheel brake mechanism 32 are partially included in the hydraulic pressure control unit 12.

Each of the front-wheel brake mechanism 31 and the rear-wheel brake mechanism 32 includes: a master cylinder 51 in which a piston (not illustrated) is installed; a reservoir 52 that is attached to the master cylinder 51; a brake caliper 53 that is held by the trunk of the straddle-type vehicle 1 and has a brake pad (not illustrated); a wheel cylinder 54 that is provided to the brake caliper 53; a primary channel 55 through which a brake fluid in the master cylinder 51 flows into the wheel cylinder 54; a secondary channel 56 through which the brake fluid in the wheel cylinder 54 is released; and a supply channel 57 through which the brake fluid in the master cylinder 51 is supplied to the secondary channel 56.

An inlet valve (EV) 61 is provided to the primary channel 55. The secondary channel 56 bypasses a portion of the primary channel 55 between the wheel cylinder 54 side and the master cylinder 51 side of the inlet valve 61. The secondary channel 56 is sequentially provided with an outlet valve (AV) 62, an accumulator 63, and a pump 64 from an upstream side. A first valve (USV) 65 is provided between an end portion on the master cylinder 51 side of the primary channel 55 and a portion of the primary channel 55 to which a downstream end portion of the secondary channel 56 is connected. The supply channel 57 communicates between the master cylinder 51 and a portion on a suction side of the pump 64 in the secondary channel 56. A second valve (HSV) 66 is provided to the supply channel 57.

The inlet valve 61 is an electromagnetic valve that is opened in an unenergized state and is closed in an energized state, for example. The outlet valve 62 is an electromagnetic valve that is closed in an unenergized state and is opened in an energized state, for example. The first valve 65 is an electromagnetic valve that is opened in an unenergized state and is closed in an energized state, for example. The second valve 66 is an electromagnetic valve that is closed in an unenergized state and is opened in an energized state, for example.

The hydraulic pressure control unit 12 includes: components such as the inlet valves 61, the outlet valves 62, the accumulators 63, the pumps 64, the first valves 65, and the second valves 66 used to control the brake hydraulic pressure; and a base body **12*a* to which those components are provided and in which channels constituting the primary channels 55, the secondary channels 56, and the supply channels 57** are formed.

The base body **12*a* may be formed of one member or may be formed of plural members. In addition, in the case where the base body 12*a*** is formed of the plural members, the components may separately be provided to the different members.

The operation of the above components in the hydraulic pressure control unit 12 is controlled by the execution section 22 of the controller 20. As a result, the braking force generated on the front wheel 2 by the front-wheel brake mechanism 31 and the braking force generated on the rear wheel 3 by the rear-wheel brake mechanism 32 are controlled.

During normal time (that is, when the braking force corresponding to a brake operation by the rider is set to be generated on the wheel), the controller 20 opens the inlet valve 61, closes the outlet valve 62, opens the first valve 65, and closes the second valve 66. When the first brake operation section 41 is operated in such a state, in the front-wheel brake mechanism 31, the piston (not illustrated) in the master cylinder 51 is pressed to increase the hydraulic pressure of the brake fluid in the wheel cylinder 54, the brake pad (not illustrated) of the brake caliper 53 is then pressed against a rotor **2*a* of the front wheel 2, and the braking force is thereby generated on the front wheel 2. Meanwhile, when the second brake operation section 42 is operated, in the rear-wheel brake mechanism 32, the piston (not illustrated) in the master cylinder 51 is pressed to increase the hydraulic pressure of the brake fluid in the wheel cylinder 54, the brake pad (not illustrated) of the brake caliper 53 is then pressed against a rotor 3*a* of the rear wheel 3, and the braking force is thereby generated on the rear wheel 3**.

Here, the execution section 22 can execute vehicle speed control for controlling a vehicle speed of the straddle-type vehicle 1 on the basis of a target vehicle speed in the case where it is determined that the straddle-type vehicle 1 travels on a downhill road. The vehicle speed control is control for automatically suppressing the vehicle speed of the straddle-type vehicle 1 to be low at the time when the straddle-type vehicle 1 travels on the downhill road. In the vehicle speed control, for example, the execution section 22 reduces the vehicle speed of the straddle-type vehicle 1 to the target vehicle speed and maintains the vehicle speed of the straddle-type vehicle 1 at the target vehicle speed. Here, the execution section 22 can appropriately execute the vehicle speed control on the basis of the vehicle speed of the straddle-type vehicle 1 that is acquired on the basis of the detection result of the front-wheel rotational frequency sensor 14 and the detection result of the rear-wheel rotational frequency sensor 15, for example.

The vehicle speed control can correspond to control referred to as hill descent control.

In the vehicle speed control, for example, the execution section 22 brings the straddle-type vehicle 1 into a state where the inlet valve 61 is opened, the outlet valve 62 is closed, the first valve 65 is closed, and the second valve 66 is opened, and drives the pump 64 in such a state. In this way, the execution section 22 increases the hydraulic pressure of the brake fluid in the wheel cylinder 54, and can thereby generate the braking force on the wheel. In addition, for example, by bringing the straddle-type vehicle 1 into a state where both of the inlet valve 61 and the outlet valve 62 are closed, the execution section 22 can maintain the hydraulic pressure of the brake fluid in the wheel cylinder 54 and can thereby maintain the braking force generated on the wheel. In this way, the execution section 22 can reduce the vehicle speed of the straddle-type vehicle 1 to the target vehicle speed and can thereby maintain the vehicle speed of the straddle-type vehicle 1 at the target vehicle speed. Thus, it is possible to automatically suppress the vehicle speed of the straddle-type vehicle 1 to be low at the time when the straddle-type vehicle 1 travels on the downhill road. In the case where the vehicle speed of the straddle-type vehicle 1 is reduced to be lower than the target vehicle speed during execution of the vehicle speed control, the execution section 22 controls the engine 11 in a manner to increase the vehicle speed of the straddle-type vehicle 1 to the target vehicle speed.

In the vehicle speed control, the execution section 22 may brake both of the front wheel 2 and the rear wheel 3 or may brake only one of the front wheel 2 and the rear wheel 3.

The above description has been made on the brake system 10 with reference to FIG. 3. However, the example in FIG. 3 is merely one example, and the configuration of the brake system 10 is not limited to that in the example illustrated in FIG. 3. For example, the hydraulic pressure control unit 12 may only control the braking force generated on one of the front wheel 2 and the rear wheel 3. In addition, for example, the hydraulic pressure control unit 12 may not include the supply channel 57, the first valve 65, and the second valve 66. Also, in this case, for example, by closing both of the inlet valve 61 and the outlet valve 62, it is possible to maintain the hydraulic pressure of the brake fluid in the wheel cylinder 54 and can thereby maintain the vehicle speed of the straddle-type vehicle 1 at the target vehicle speed. In other words, also, in this case, the execution section 22 can execute the vehicle speed control.

A further detailed description will herein be made on a configuration of the handlebar 4 and surroundings thereof with reference to FIG. 4 and FIG. 5. FIG. 4 is a schematic view illustrating an outline configuration of the handlebar 4 and the surroundings thereof. More specifically, FIG. 4 is a view in which an upper front portion of the straddle-type vehicle 1 is seen from vertically above.

As illustrated in FIG. 4, the handlebar 4 includes a right grip 4R and a left grip 4L. The handlebar 4 extends in a vehicle width direction. The right grip 4R is formed in a right end portion of the handlebar 4 and is grasped by the rider's right hand during travel. The left grip 4L is formed in a left end portion of the handlebar 4 and is grasped by the rider's left hand during the travel. In particular, the right grip 4R is an accelerator grip that is used for an accelerator operation (that is, an operation to accelerate the straddle-type vehicle 1) by the rider. An operation to rotate the accelerator grip corresponds to the accelerator operation. Hereafter, the right grip 4R will also be referred to as an accelerator grip 4R.

The first brake operation section 41 is provided near the right grip (the accelerator grip) 4R. The rider can grip the first brake operation section 41 with his/her right hand. An operation to grip the first brake operation section 41 corresponds to the brake operation (that is, an operation to decelerate the straddle-type vehicle 1). An operation to depress the above-described second brake operation section 42 also corresponds to the brake operation. A clutch operation section 43 is provided near the left grip 4L. The clutch operation section 43 is a clutch lever, for example. The rider can grip the clutch operation section 43 with his/her left hand. An operation to grip the clutch operation section 43 corresponds to a clutch operation (that is, an operation to release a clutch that connects/disconnects power transmission from the engine 11 to the drive wheel).

FIG. 5 is a schematic view illustrating a rotational direction of the accelerator grip 4R. More specifically, FIG. 5 is a view in which the accelerator grip 4R is seen in a direction of an arrow A in FIG. 4 (that is, a view in which the accelerator grip 4R is seen from a vehicle right side along an axial direction thereof).

More specifically, the accelerator grip 4R is cylindrical or columnar and rotatable about a center axis of the accelerator grip 4R. The accelerator grip 4R has such a structure that a rotational position of the accelerator grip 4R returns to a reference position P0 in an unloaded state by the rider (that is, a state where the accelerator grip 4R does not receive a load from the outside). Such a structure can be obtained by using a restoring force of a spring or the like, for example. Just as described, the accelerator grip 4R is located at the reference position P0 in the unloaded state by the rider.

When the accelerator grip 4R is rotated within an angle range located in a first direction D1 (more specifically, in a counterclockwise direction when seen from the vehicle right side) with the reference position P0 being a reference (more specifically, an entire range on the first direction D1 side of the reference position P0), the drive power generated to the straddle-type vehicle 1 is changed. More specifically, the drive power generated to the straddle-type vehicle 1 is minimized when the rotational position of the accelerator grip 4R is the reference position P0. Then, by rotating the accelerator grip 4R in the first direction D1 from the reference position P0, the drive power generated to the straddle-type vehicle 1 can be increased.

In the case where the accelerator grip 4R is located within the angle range located in the first direction D1 with the reference position P0 being the reference, the drive power generated to the straddle-type vehicle 1 is increased as a relative angle of the rotational position of the accelerator grip 4R to the reference position P0 is increased. For example, in the case where the rotational position of the accelerator grip 4R is a position P1 in FIG. 5 (more specifically, a position to which the accelerator grip 4R is rotated in the first direction D1 from the reference position P0 by an angle θ1), the drive power that corresponds to the angle θ1 is generated to the straddle-type vehicle 1. Accordingly. in the case where the accelerator grip 4R is located within the angle range located in the first direction D1 with the reference position P0 being the reference, the drive power is increased when the accelerator grip 4R is rotated in the first direction D1, and the drive power is reduced when the accelerator grip 4R is rotated in a second direction D2 that is a reverse direction from the first direction D1 (more specifically, a clockwise direction when seen from the vehicle right side).

<Operation of Controller>

A description will be made on operation of the controller 20 according to the embodiment of the invention with reference to FIG. 6 to FIG. 8.

As described above, the execution section 22 of the controller 20 can execute the vehicle speed control for controlling the vehicle speed of the straddle-type vehicle 1 on the basis of the target vehicle speed in the case where it is determined that the straddle-type vehicle 1 travels on the downhill road. More specifically, the execution section 22 executes a control mode in which the vehicle speed control is enabled in response to a first trigger and the vehicle speed control is disabled in response to a second trigger. Hereafter, the above control mode will also simply be referred to as the control mode.

The above description has been made on the rotational direction of the accelerator grip 4R with reference to FIG. 5. Here, the accelerator grip 4R can be rotated in the second direction D2 as the reverse direction from the first direction D1 with the reference position P0 being the reference. Accordingly, the rider can perform a rotational operation to rotate the accelerator grip 4R to the second direction D2 side of the reference position P0 (that is, a rotational operation to rotate the accelerator grip 4R within the angle range located in the second direction D2 as the reverse direction from the first direction D1 with the reference position P0 being the reference). Hereafter, the above rotational operation will also simply be referred to as the rotational operation.

In this embodiment, the execution section 22 executes the above control mode on the basis of rotational operation information that is information on the rotational operation. In this way, as will be described below, operability of the straddle-type vehicle 1 is improved. Hereinafter, a description will sequentially be made on first processing, second processing, and third processing as processing examples in each of which the control mode is executed on the basis of the rotational operation information.

FIG. 6 is a flowchart illustrating an example of a first processing procedure that is executed by the controller 20. Step S101 in FIG. 6 corresponds to initiation of a control flow illustrated in FIG. 6. When the control flow illustrated in FIG. 6 is initiated, the vehicle speed control is disabled.

When the control flow illustrated in FIG. 6 is initiated, in step S102, the execution section 22 determines whether a permission condition for the vehicle speed control is satisfied. The permission condition for the vehicle speed control is a condition to permit the vehicle speed control. If the permission condition for the vehicle speed control is satisfied, the vehicle speed control is permitted. On the other hand, if the permission condition for the vehicle speed control is not satisfied, the vehicle speed control is prohibited.

As the permission condition for the vehicle speed control, such a condition is used that the straddle-type vehicle 1 travels on the downhill road. The execution section 22 can determine whether the straddle-type vehicle 1 travels on the downhill road on the basis of the detection result of the inertial measurement unit 13.

As the permission condition for the vehicle speed control, such a condition may be added that a degree of leaning of a travel road of the straddle-type vehicle 1 with respect to a horizontal direction of the travel road is greater than a reference degree. For example, the reference degree is set to such a degree with which it is possible to determine whether the vehicle speed control has to be executed. The execution section 22 can determine whether the degree of leaning of the travel road of the straddle-type vehicle 1 with respect to the horizontal direction of the travel road is greater than the reference degree on the basis of a gradient of the travel road of the straddle-type vehicle 1. The gradient of the travel road of the straddle-type vehicle 1 can be acquired on the basis of the detection result of the inertial measurement unit 13, for example.

If it is determined in step S102 that the permission condition for the vehicle speed control is not satisfied (step S102/NO), the processing in step S102 is repeated. On the other hand, if it is determined that the permission condition for the vehicle speed control is satisfied (step S102/YES), the processing proceeds to step S103.

In step S103, the execution section 22 determines whether the rotational operation information is information indicating that the rotational operation has been performed. The rotational operation information is output to the controller 20 from a sensor provided to the accelerator grip 4R, or the like, for example. The rotational operation information only needs to be information on the rotational operation and can include information on the rotational position of the accelerator grip 4R, for example. The rotational operation information may be output to the controller 20 from a device (for example, a camera that captures an image of the accelerator grip 4R, or the like) other than the sensor provided to the accelerator grip 4R.

For example, the rotational operation is an operation to rotate the accelerator grip 4R in the second direction D2 from the reference position P0. For example, the rotational operation is an operation to rotate the accelerator grip 4R in the second direction D2 from the reference position P0 by a predetermined angle. In an example illustrated in FIG. 5, for example, an operation to rotate the accelerator grip 4R from the reference position P0 to a position P2 (more specifically, a position to which the accelerator grip 4R is rotated in the second direction D2 from the reference position P0 by an angle θ2) corresponds to the rotational operation.

However, the rotational operation may be an operation to first rotate the accelerator grip 4R in the second direction D2 from the reference position P0 and thereafter slightly rotate the accelerator grip 4R back in the first direction D1. For example, the rotational operation may be an operation that includes, in addition to the operation to rotate the accelerator grip 4R in the second direction D2 from the reference position P0 by the predetermined angle, an operation to thereafter rotate the accelerator grip 4R back in the first direction D1. In the example illustrated in FIG. 5, the following operation corresponds to the rotational operation. For example, the accelerator grip 4R is rotated from the reference position P0 to the position P2 and is thereafter rotated back in the first direction D1 to the reference position P0 or a position on the position P2 side of the reference position P0.

If it is determined in step S103 illustrated in FIG. 6 that the rotational operation information is not the information indicating that the rotational operation has been performed (step S103/NO), the processing returns to step S102. On the other hand, if it is determined that the rotational operation information is the information indicating that the rotational operation has been performed (step S103/YES), the processing proceeds to step S104.

In step S104, the execution section 22 enables the vehicle speed control with the rotational operation as the first trigger. In this way, the vehicle speed control is initiated. Just as described, in the first processing, the rotational operation is used as an initiation trigger of the vehicle speed control. Thus, the rider can initiate the vehicle speed control by performing the rotational operation.

At initiation of the vehicle speed control, the execution section 22 reduces the vehicle speed of the straddle-type vehicle 1 to the target vehicle speed. The target vehicle speed is set according to the gradient of the travel road of the straddle-type vehicle 1, for example. Here, the execution section 22 may change an initiation state of the vehicle speed control on the basis of the rotational operation information. In other words, the initiation state of the vehicle speed control is a control state at the initiation of the vehicle speed control. For example, the execution section 22 may change the target vehicle speed at the initiation of the vehicle speed control on the basis of the rotational operation information.

For example, the execution section 22 may change the initiation state of the vehicle speed control on the basis of information on an operation amount of the rotational operation as the rotational operation information. For example, it is considered that, in the example illustrated in FIG. 5, when the rotational operation is performed, the rotational position of the accelerator grip 4R further moves beyond the position P2 in the second direction D2. In this case, as the operation amount of the rotational operation, a rotational amount by which the accelerator grip 4R is further rotated in the second direction D2 with the position P2 being a reference can be used. For example, the execution section 22 changes the target vehicle speed at the initiation of the vehicle speed control on the basis of the information on the operation amount of the rotational operation. More specifically, in the example illustrated in FIG. 5, the execution section 22 may reduce the target vehicle speed at the initiation of the vehicle speed control as the above rotational amount is increased.

For example, the execution section 22 may change the initiation state of the vehicle speed control on the basis of information on a degree of a change in the operation amount of the rotational operation as the rotational operation information. As the degree of the change in the operation amount of the rotational operation, for example, an average rotational speed of the accelerator grip 4R can be used. For example, in the example illustrated in FIG. 5, the average rotational speed of the accelerator grip 4R may be the average rotational speed of the accelerator grip 4R at the time when the rotational position of the accelerator grip 4R moves from the reference position P0 to the position P2. In the case where the rotational position of the accelerator grip 4R further moves beyond the position P2 in the second direction D2, the average rotational speed of the accelerator grip 4R may be the average rotational speed of the accelerator grip 4R in a period between initiation and termination of the movement of the accelerator grip 4R in the second direction D2. For example, the execution section 22 changes the target vehicle speed at the initiation of the vehicle speed control on the basis of the information on the degree of the change in the operation amount of the rotational operation. More specifically, the execution section 22 may reduce the target vehicle speed at the initiation of the vehicle speed control as the average rotational speed of the accelerator grip 4R is increased.

After step S104, in step S105, the execution section 22 determines whether a termination condition for the vehicle speed control is satisfied. The termination condition for the vehicle speed control is a condition to disable the vehicle speed control for termination. As the termination condition for the vehicle speed control, for example, such a condition is used that the brake operation or the accelerator operation is performed by the rider of the straddle-type vehicle 1. Even in the case where the brake operation or the accelerator operation is not performed, it is determined that the termination condition is satisfied when the initiation condition is no longer satisfied (for example, when the travel road of the straddle-type vehicle 1 becomes a flat road).

If it is determined in step S105 that the termination condition for the vehicle speed control is not satisfied (step S105/NO), the processing in step S105 is repeated. On the other hand, if it is determined that the termination condition for the vehicle speed control is satisfied (step S105/YES), the processing proceeds to step S106.

In step S106, the execution section 22 disables the vehicle speed control by using, as the second trigger, a fact that the termination condition for the vehicle speed control is satisfied. In this way, the vehicle speed control is terminated. Then, after step S106, the processing returns to step S102.

As it has been described so far, in the first processing, in the case where the rotational operation information is the information indicating that the rotational operation has been performed, the execution section 22 enables the vehicle speed control with the rotational operation as the first trigger in the control mode. Just as described, in the first processing, the rotational operation is used as the initiation trigger of the vehicle speed control. Thus, the rider can initiate the vehicle speed control by performing the rotational operation.

Here, as the initiation trigger of the vehicle speed control, such a case is considered that an operation other than the rotational operation is adopted. For example, as in the second processing, which will be described below, there is a case where an operation using an input device, such as a button, that is provided at a different location from the accelerator grip 4R is adopted as the initiation trigger of the vehicle speed control. In this case, in order to initiate the vehicle speed control, the rider has to remove his/her hand from the handlebar 4 and perform the operation using the input device. Meanwhile, as in the first processing, by adopting the rotational operation as the initiation trigger of the vehicle speed control, the rider can initiate the vehicle speed control with an intuitive and simple operation. Therefore, it is possible to improve operability of the operation related to the vehicle speed control.

The above description has been made on the example in which the execution section 22 changes the initiation state of the vehicle speed control on the basis of the rotational operation information in the case where the rotational operation is used as the initiation trigger of the vehicle speed control. However, in the case where the rotational operation is not used as the initiation trigger of the vehicle speed control, the execution section 22 may change the initiation state of the vehicle speed control on the basis of the rotational operation information.

FIG. 7 is a flowchart illustrating an example of a second processing procedure that is executed by the controller 20. Step S201 in FIG. 7 corresponds to initiation of a control flow illustrated in FIG. 7. When the control flow illustrated in FIG. 7 is initiated, the vehicle speed control is disabled.

When the control flow illustrated in FIG. 7 is initiated, in step S202, the execution section 22 determines whether the permission condition for the vehicle speed control is satisfied. The processing in step S202 is the same as the processing in step S102 illustrated in FIG. 6.

If it is determined in step S202 that the permission condition for the vehicle speed control is not satisfied (step S202/NO), the processing in step S202 is repeated. On the other hand, if it is determined that the permission condition for the vehicle speed control is satisfied (step S202/YES), the processing proceeds to step S203.

In step S203, the execution section 22 determines whether the initiation condition for the vehicle speed control is satisfied. The initiation condition for the vehicle speed control is a condition to enable the vehicle speed control for initiation. As the initiation condition for the vehicle speed control, for example, such a condition is used that the operation using the input device, such as the button, that is provided at the different location from the accelerator grip 4R is performed by the rider of the straddle-type vehicle 1.

If it is determined in step S203 that the initiation condition for the vehicle speed control is not satisfied (step S203/NO), the processing returns to step S202. On the other hand, if it is determined that the initiation condition for the vehicle speed control is satisfied (step S203/YES), the processing proceeds to step S204.

In step S204, the execution section 22 enables the vehicle speed control by using, as the first trigger, a fact that the initiation condition for the vehicle speed control is satisfied. In this way, the vehicle speed control is initiated.

After step S204, in step S205, it is determined whether the rotational operation information is the information indicating that the rotational operation has been performed. The processing in step S205 is the same as the processing in step S103 illustrated in FIG. 6.

If it is determined in step S205 that the rotational operation information is not the information indicating that the rotational operation has been performed (step S205/NO), the processing in step S205 is repeated. On the other hand, if it is determined that the rotational operation information is the information indicating that the rotational operation has been performed (step S205/YES), the processing proceeds to step S206.

In step S206, the execution section 22 disables the vehicle speed control with the rotational operation as the second trigger. In this way, the vehicle speed control is terminated. Then, after step S206, the processing returns to step S202. Just as described, in the second processing, the rotational operation is used as a termination trigger of the vehicle speed control. Thus, the rider can terminate the vehicle speed control by performing the rotational operation.

As it has been described so far, in the second processing, in the case where the rotational operation information is the information indicating that the rotational operation has been performed, the execution section 22 disables the vehicle speed control with the rotational operation as the second trigger in the control mode. Just as described, in the second processing, the rotational operation is used as the termination trigger of the vehicle speed control. Thus, the rider can terminate the vehicle speed control by performing the rotational operation.

Here, as the termination trigger of the vehicle speed control, such a case is considered that an operation other than the rotational operation is adopted. For example, as in the above-described first processing, there is a case where the brake operation is adopted as the termination trigger of the vehicle speed control. In this case, in order to terminate the vehicle speed control, the rider has to perform the brake operation, which is essentially the operation to brake the straddle-type vehicle 1. The thus-performed brake operation is hardly an intuitive operation for the rider. In addition, for example, as in the above-described first processing, the accelerator operation may be adopted as the termination trigger of the vehicle speed control. In this case, in a situation where the straddle-type vehicle 1 travels on the downhill road, the accelerator operation has to be performed in order to terminate the vehicle speed control. The thus-performed accelerator operation is hardly the intuitive operation for the rider. Meanwhile, as in the second processing, by adopting the rotational operation as the termination trigger of the vehicle speed control, the rider can terminate the vehicle speed control by the intuitive operation with no sense of discomfort. Therefore, it is possible to improve the operability of the operation related to the vehicle speed control.

FIG. 8 is a flowchart illustrating an example of a third processing procedure that is executed by the controller 20. Step S301 in FIG. 8 corresponds to initiation of a control flow illustrated in FIG. 8. The control flow illustrated in FIG. 8 is executed during the execution of the vehicle speed control.

When the control flow illustrated in FIG. 8 is initiated, in step S302, the execution section 22 determines whether the rotational operation information is the information indicating that the rotational operation has been performed. The processing in step S302 is the same as the processing in step S103 illustrated in FIG. 6.

If it is determined in step S302 that the rotational operation information is not the information indicating that the rotational operation has been performed (step S302/NO), the processing in step S302 is repeated. On the other hand, if it is determined that the rotational operation information is the information indicating that the rotational operation has been performed (step S302/YES), the processing proceeds to step S303.

In step S303, the execution section 22 reduces the target vehicle speed for the vehicle speed control, and then the processing returns to step S302.

As described above, the execution section 22 may change a continuous state of the vehicle speed control on the basis of the information on the rotational operation, which is performed during the execution of the vehicle speed control, as the rotational operation information. In other words, the continuous state of the vehicle speed control is a control state during the execution (that is, during continuation) of the vehicle speed control. For example, the execution section 22 may change the target vehicle speed for the vehicle speed control on the basis of the information on the rotational operation, which is performed during the execution of the vehicle speed control, as the rotational operation information.

In the above example, the description has been made on the example in which the execution section 22 reduces the target vehicle speed for the vehicle speed control in the case where the rotational operation is performed during the execution of the vehicle speed control. However, the execution section 22 may increase the target vehicle speed for the vehicle speed control in the case where the rotational operation is performed during the execution of the vehicle speed control.

When changing the target vehicle speed during the continuation of the vehicle speed control, the execution section 22 may change a change amount of the target vehicle speed on the basis of the rotational operation information.

For example, the execution section 22 may change the continuous state of the vehicle speed control on the basis of the information on the operation amount of the rotational operation as the rotational operation information. More specifically, when changing the target vehicle speed during the continuation of the vehicle speed control, the execution section 22 may change the change amount of the target vehicle speed on the basis of the operation amount of the rotational operation. For example, when changing the target vehicle speed during the continuation of the vehicle speed control, the execution section 22 may increase the change amount of the target vehicle speed as the operation amount of the rotational operation is increased.

For example, the execution section 22 may change the continuous state of the vehicle speed control on the basis of the information on the degree of the change in the operation amount of the rotational operation as the rotational operation information. More specifically, when changing the target vehicle speed during the continuation of the vehicle speed control, the execution section 22 may change the change amount of the target vehicle speed on the basis of the degree of the change in the operation amount of the rotational operation. For example, when changing the target vehicle speed during the continuation of the vehicle speed control, the execution section 22 may increase the change amount of the target vehicle speed as the degree of the change in the operation amount of the rotational operation is increased.

As it has been described so far, in the third processing, in the control mode, the execution section 22 changes the continuous state of the vehicle speed control on the basis of the information on the rotational operation, which is performed during the execution of the vehicle speed control, as the rotational operation information. In this way, it is possible to change the continuous state of the vehicle speed control with the simple operation during the execution of the vehicle speed control. Therefore, it is possible to improve the operability of the operation related to the vehicle speed control.

The above description has been made on the first processing, the second processing, and the third processing as the processing examples in each of which the control mode is executed on the basis of the rotational operation information with reference to FIG. 6 to FIG. 8. The first processing, the second processing, and the third processing may be executed independently or may be executed in combination. For example, as in the first processing, the rotational operation may be adopted as the initiation trigger of the vehicle speed control. In addition, as in the second processing, the rotational operation may be adopted as the termination trigger of the vehicle speed control. For example, the third processing may be executed during the execution of the vehicle speed control in the first processing (that is, in step S104 illustrated in FIG. 6). For example, the third processing may be executed during the execution of the vehicle speed control in the second processing (that is, in step S204 illustrated in FIG. 7). Furthermore, for example, the third processing may be executed during the execution of the vehicle speed control in the case where the rotational operation is adopted as both of the initiation trigger and the termination trigger of the vehicle speed control.

<Effects of Controller>

A description will be made on effects of the controller 20 according to the embodiment of the invention.

In the controller 20, the execution section 22 executes the control mode in which the vehicle speed control is enabled in response to the first trigger and the vehicle speed control is disabled in response to the second trigger. In the vehicle speed control, the vehicle speed of the straddle-type vehicle 1 is controlled on the basis of the target vehicle speed in the case where it is determined that the straddle-type vehicle 1 travels on the downhill road. Then, the execution section 22 executes the control mode on the basis of the rotational operation information as the information on the rotational operation to rotate the accelerator grip 4R, which is located at the reference position P0 in the unloaded state by the rider and changes the drive power generated to the straddle-type vehicle 1 when being rotated within the angle range located in the first direction D1 with the reference position P0 being the reference, within the angle range located in the second direction D2 as the reverse direction from the first direction D1 with the reference position P0 being the reference. In this way, the rider can use the vehicle speed control with the intuitive or simple operation and thus can improve the operability of the operation related to the vehicle speed control. Therefore, it is possible to improve the operability of the straddle-type vehicle 1.

Preferably, in the controller 20, in the case where the rotational operation information is the information indicating that the rotational operation has been performed, the execution section 22 enables the vehicle speed control with the rotational operation as the first trigger in the control mode. In this way, the rider can initiate the vehicle speed control with the intuitive and simple operation. Therefore, it is possible to appropriately improve the operability of the operation related to the vehicle speed control.

Preferably, in the controller 20, in the control mode, the execution section 22 changes the initiation state of the vehicle speed control on the basis of the information on the operation amount of the rotational operation as the rotational operation information. In this way, it is possible to change the initiation state of the vehicle speed control with the simple operation at the initiation of the vehicle speed control. Therefore, it is possible to further effectively improve the operability of the operation related to the vehicle speed control.

Preferably, in the controller 20, in the control mode, the execution section 22 changes the target vehicle speed at the initiation of the vehicle speed control on the basis of the information on the operation amount of the rotational operation as the rotational operation information. In this way, it is possible to change the target vehicle speed with the simple operation at the initiation of the vehicle speed control. Therefore, it is possible to further effectively improve the operability of the operation related to the vehicle speed control.

Preferably, in the controller 20, in the control mode, the execution section 22 changes the initiation state of the vehicle speed control on the basis of the information on the degree of the change in the operation amount of the rotational operation as the rotational operation information. In this way, it is possible to change the initiation state of the vehicle speed control with the simple operation at the initiation of the vehicle speed control. Therefore, it is possible to further effectively improve the operability of the operation related to the vehicle speed control.

Preferably, in the controller 20, in the control mode, the execution section 22 changes the target vehicle speed at the initiation of the vehicle speed control on the basis of the information on the degree of the change in the operation amount of the rotational operation as the rotational operation information. In this way, it is possible to change the target vehicle speed with the simple operation at the initiation of the vehicle speed control. Therefore, it is possible to further effectively improve the operability of the operation related to the vehicle speed control.

Preferably, in the controller 20, in the case where the rotational operation information is the information indicating that the rotational operation has been performed, the execution section 22 disables the vehicle speed control with the rotational operation as the second trigger in the control mode. In this way, the rider can terminate the vehicle speed control by the intuitive operation with no sense of discomfort. Therefore, it is possible to appropriately improve the operability of the operation related to the vehicle speed control.

Preferably, in the controller 20, the execution section 22 changes the continuous state of the vehicle speed control on the basis of the information on the rotational operation, which is performed during the execution of the vehicle speed control, as the rotational operation information in the control mode. In this way, it is possible to change the continuous state of the vehicle speed control with the simple operation during the execution of the vehicle speed control. Therefore, it is possible to appropriately improve the operability of the operation related to the vehicle speed control.

Preferably, in the controller 20, in the control mode, the execution section 22 changes the continuous state of the vehicle speed control on the basis of the information on the operation amount of the rotational operation as the rotational operation information. In this way, it is possible to appropriately change the continuous state of the vehicle speed control with the simple operation during the execution of the vehicle speed control. Therefore, it is possible to further effectively improve the operability of the operation related to the vehicle speed control.

Preferably, in the controller 20, in the control mode, the execution section 22 changes the target vehicle speed during the continuation of the vehicle speed control on the basis of the information on the operation amount of the rotational operation as the rotational operation information. In this way, it is possible to change the target vehicle speed with the simple operation during the execution of the vehicle speed control. Therefore, it is possible to further effectively improve the operability of the operation related to the vehicle speed control.

Preferably, in the controller 20, in the control mode, the execution section 22 changes the continuous state of the vehicle speed control on the basis of the information on the degree of the change in the operation amount of the rotational operation as the rotational operation information. In this way, it is possible to appropriately change the continuous state of the vehicle speed control with the simple operation during the execution of the vehicle speed control. Therefore, it is possible to further effectively improve the operability of the operation related to the vehicle speed control.

Preferably, in the controller 20, in the control mode, the execution section 22 changes the target vehicle speed during the continuation of the vehicle speed control on the basis of the information on the degree of the change in the operation amount of the rotational operation as the rotational operation information. In this way, it is possible to change the target vehicle speed with the simple operation during the execution of the vehicle speed control. Therefore, it is possible to further effectively improve the operability of the operation related to the vehicle speed control.

The invention is not limited to the embodiment that has been described. For example, only a part of the embodiment may be implemented.

REFERENCE SIGNS LIST

1: Straddle-type vehicle
2: Front wheel
2*a*: Rotor
3: Rear wheel
3*a*: Rotor
4: Handlebar
4L: Left grip
4R: Right grip (accelerator grip)
10: Brake system
11: Engine
12: Hydraulic pressure control unit
12*a*: Base body
13: Inertial measurement unit
14: Front-wheel rotational frequency sensor
15: Rear-wheel rotational frequency sensor
20: Controller
21: Acquisition section
22: Execution section
31: Front-wheel brake mechanism
32: Rear-wheel brake mechanism
41: First brake operation section
42: Second brake operation section
43: Clutch operation section
51: Master cylinder
52: Reservoir
53: Brake caliper
54: Wheel cylinder
55: Primary channel
56: Secondary channel
57: Supply channel
61: Inlet valve
62: Outlet valve
63: Accumulator
64: Pump
65: First valve
66: Second valve
A: Arrow
D1: First direction
D2: Second direction
P0: Reference position
P1: Position
P2: Position
θ1: Angle
θ2: Angle

The invention claimed is:

1. A controller (20) that controls behavior of a straddle-type vehicle (1), the controller configured to:

execute a control mode in which vehicle speed control is enabled in response to a first trigger and the vehicle speed control is disabled in response to a second trigger, in the vehicle speed control, a vehicle speed of the straddle-type vehicle (1) being controlled based on a target vehicle speed in the case where it is determined that the straddle-type vehicle (1) travels on a downhill road, wherein the first trigger or the second trigger is based on a rotation of an accelerator grip (4R), which is located at a reference position (P0) in an unrotated state and changes drive power generated to the straddle-type vehicle (1) when rotated within an angle range located in a first direction (D1) with the reference position (P0) being a reference, within an angle range located in a second direction (D2) as a reverse direction from the first direction (D1) with the reference position (P0) being the reference.

2. The controller according to claim 1, wherein in the control mode, the controller changes an initiation state of the vehicle speed control based on an amount of the rotation of the accelerator grip (4R).

3. The controller according to claim 2, wherein in the control mode, the controller changes the target vehicle speed at initiation of the vehicle speed control based on the amount of rotation of the accelerator grip (4R).

4. The controller according to claim 1, wherein in the control mode, the controller changes an initiation state of the vehicle speed control based on a degree of change in the rotation of the accelerator grip (4R).

5. The controller according to claim 4, wherein in the control mode, the controller changes the target vehicle speed at initiation of the vehicle speed control based on the degree of change in the rotation of the accelerator grip (4R).

6. The controller according to claim 1, wherein in the control mode, the controller changes a continuous state of the vehicle speed control based on the rotation of the accelerator grip (4R) being performed during execution of the vehicle speed control.

7. The controller according to claim 6, wherein in the control mode, the controller changes the continuous state of the vehicle speed control based on the rotation of the accelerator grip (4R).

8. The controller according to claim 7, wherein in the control mode, the controller changes the target vehicle speed during continuation of the vehicle speed control based on the rotation of the accelerator grip (4R).

9. The controller according to claim 6, wherein in the control mode, the controller changes the continuous state of the vehicle speed control based on information on a degree of a change in an amount of the rotation of the accelerator grip (4R).

10. The controller according to claim 9, wherein in the control mode, the controller changes the target vehicle speed during continuation of the vehicle speed control based on the information on the degree of the change in the amount of the rotation of the accelerator grip (4R).

11. The controller according to claim 1, wherein the first trigger is based on the rotation of the accelerator grip (4R), and the second trigger is based on a brake operation.

12. The controller according to claim 1, wherein the first trigger is based on the rotation of the accelerator grip (4R), and the second trigger is based on an accelerator operation.

13. The controller according to claim 1, wherein the first trigger is based on the rotation of the accelerator grip (4R), and in a case where a travel road of the straddle-type vehicle (1) becomes a flat road after a downhill road, the second trigger is satisfied.

14. The controller according to claim 1, wherein the first trigger is based on an operation using an input device provided at a different location from the accelerator grip (4R), and the second trigger is based on the rotation of the accelerator grip (4R).

15. A control method for controlling behavior of a straddle-type vehicle (1), the control method comprising:

executing a control mode in which vehicle speed control is enabled in response to a first trigger and the vehicle speed control is disabled in response to a second trigger by a controller (20), in the vehicle speed control, a vehicle speed of the straddle-type vehicle (1) being controlled based on of a target vehicle speed in the case where it is determined that the straddle-type vehicle (1) travels on a downhill road; and executing the control mode by the controller based on a rotation of an accelerator grip (4R), which is located at a reference position (P0) in an unloaded state by a rider of the straddle-type vehicle (1) and changes drive power generated to the straddle-type vehicle (1) when being rotated within an angle range located in a first direction (D1) with the reference position (P0) being a reference, within an angle range located in a second direction (D2) as a reverse direction from the first direction (D1) with the reference position (P0) being the reference, wherein the first trigger or the second trigger is the rotation of the accelerator grip (4R).

* * * * *